United States Patent [19]

Nagano et al.

[11] 4,279,172
[45] Jul. 21, 1981

[54] DERAILLEUR FOR A BICYCLE

[75] Inventors: Masashi Nagano; Mitsuhide Isobe, both of Sakai, Japan

[73] Assignee: Shimano Industrial Company Limited, Osaka, Japan

[21] Appl. No.: 862,630

[22] Filed: Dec. 20, 1977

[30] Foreign Application Priority Data

Dec. 28, 1976 [JP] Japan .................................. 51/157886

[51] Int. Cl.³ ............................................. F16H 11/04
[52] U.S. Cl. ........................................ 474/82; 280/236
[58] Field of Search ...................... 74/217 B, 242.11 B; 280/236, 238

[56] References Cited

U.S. PATENT DOCUMENTS

| 3,535,950 | 10/1970 | Shimano et al. | 74/473 |
| 3,890,847 | 6/1975 | Dian | 74/217 B |
| 3,903,751 | 9/1975 | Dian | 74/242.11 B |
| 4,038,878 | 8/1977 | Dian | 74/217 B |
| 4,051,738 | 10/1977 | Dian | 74/217 B |

FOREIGN PATENT DOCUMENTS

| 1122854 | 1/1962 | Fed. Rep. of Germany | 74/217 B |
| 2294079 | 3/1976 | France | 74/217 B |
| 2306867 | 11/1976 | France | 280/236 |
| 2327919 | 5/1977 | France | 280/236 |
| 50-68453 | 10/1973 | Japan . | |

Primary Examiner—Samuel Scott
Assistant Examiner—Randall L. Green
Attorney, Agent, or Firm—Stevens, Davis, Miller & Mosher

[57] ABSTRACT

A derailleur for a bicycle comprising four members: a stationary member, first and second linkage members and a movable member. They are arranged in the form of a pantograph mechanism. Associatd with this mechanism is a pivotal member and a spring means which may be attached to any one of the members except the second linkage member. A Bowden cable having an inner wire and an outer sheath is attached between the pivotal member and the second linkage member so that the spring means serves as both a return spring for the pantograph mechanism and as a lost motion connecting means when it is a not possible to immediately shift the derailleur.

6 Claims, 7 Drawing Figures

DERAILLEUR FOR A BICYCLE

This invention relates to a derailleur for a bicycle and is usable for either a rear or a front derailleur which is associated with multi-stage sprockets mounted on either the rear hub or adjacent to the crank of the bicycle pedals.

Generally, this kind of derailleur has a stationary member fixed to the bicycle frame by means of a bracket with the other members being swingable within a given range in relation to the bracket. First and second linkage arms and a movable member are pivotally mounted in relation to the bracket or stationary part so as to form a pantograph mechanism. If used as a rear derailleur, the movable member carries a changeover frame having two chain guide pulleys. If used as a front derailleur, a chain guide is mounted to the movable member. An actuating handle is located on the handlebars or frame of the bicycle in a position where it is accessible to the rider, and a Bowden cable extends down to the derailleur with the inner wire and outer sheath of the Bowden cable being fixed to the stationary member and one of the linkage arms so that a relative movement between the inner wire and the outer sheath causes the movable member of the pantograph to move toward or away from the bicycle chain. A return spring is used in the pantograph mechanism, as will be discussed later in greater detail.

The inner wire may be pulled to switch the chain easily without interference when the chain is moving, that is, when the bicycle pedals are being rotated. However, when the chain is at rest, when the rider is coasting or when the bicycle is completely stopped, it is not possible to move the chain from one sprocket gear to the next. When an attempt is made to shift the chain under these circumstances, undue stress is put upon the derailleur parts, and stretching of the inner wire of the Bowden cable may occur.

To overcome the problem of stress on the inner wire, various mechanisms have been used, for example, that of U.S. Pat. No. 3,535,950, which discloses a rocker arm or energy saver which is provided on a pantograph mechanism to which the inner wire is attached with this rocker arm being pivotable in relation to the stationary member or movable member of the derailleur. A spring is interposed between the rocker arm and one of the linkage members, this spring having a strength greater than that of the return spring of the pantograph mechanism so that normally the rocker arm will not move when it is possible to shift the chain, but if undue resistance is encountered, then the rocker arm will pivot so as to avoid excess stress on the inner wire. This spring stores energy which can later be used to shift the chain when it is possible to do so.

The above-described mechanism (called an energy saver) has been widely used and is quite successful so that even an unskilled cyclist can easily shift the bicycle chain. However, as previously stated, the energizing spring of the rocker arm has a strength greater than the return spring of the pantograph mechanism, and this results in a complicated construction which is troublesome to assemble.

A principal object of the present invention is to provide a derailleur having a single spring which acts as both a return spring for the pantograph mechanism and as a lost motion connection means or energy saver. Another object is to provide a derailleur which has an energy saver mechanism always properly functionable even when moving over a large range of speeds.

In the derailleur of the present invention, the pantograph mechanism has a pivotal member of a given length which is pivoted to the stationary member or the first linkage arm or to the movable member. Preferably, one of the linkage arms has an extension to which either the inner wire or the outer sheath of the Bowden cable is secured. Thus, a single spring can serve as both the return spring for restoring the movable member after being shifted by a pull of the inner wire and as a lost motion connection means when the spring is energized at a time when the chain is not moving. Hence, the derailleur of the present invention is not required to have two springs, resulting in more simple construction which is easier to assemble than that of the prior art.

Further objects and advantages of the present invention will become apparent from the following description, which is given by way of example only, with reference being made to the accompanying drawings wherein a preferred embodiment is clearly shown in which.

Figure 1:
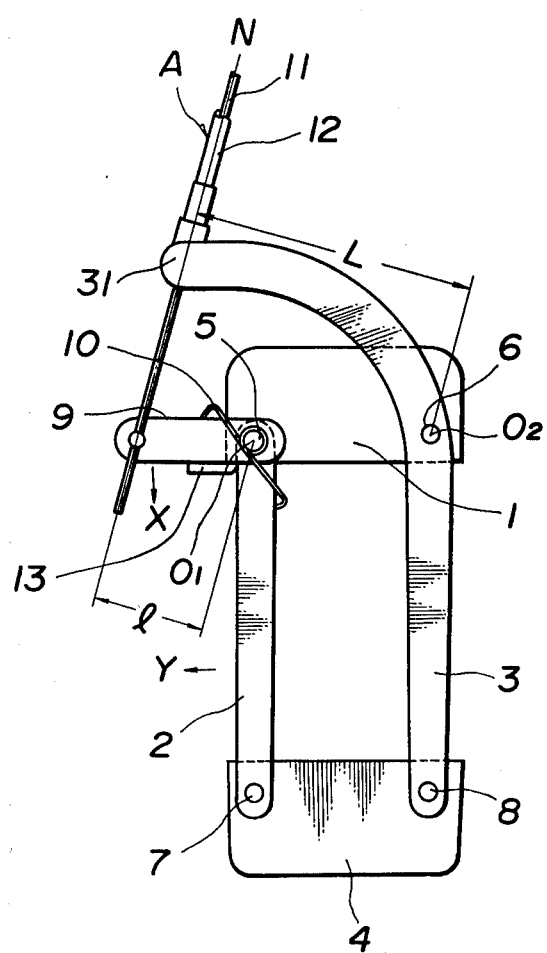
FIG. 1 is a schematic view showing the principal parts of the present invention.
Figure 2:
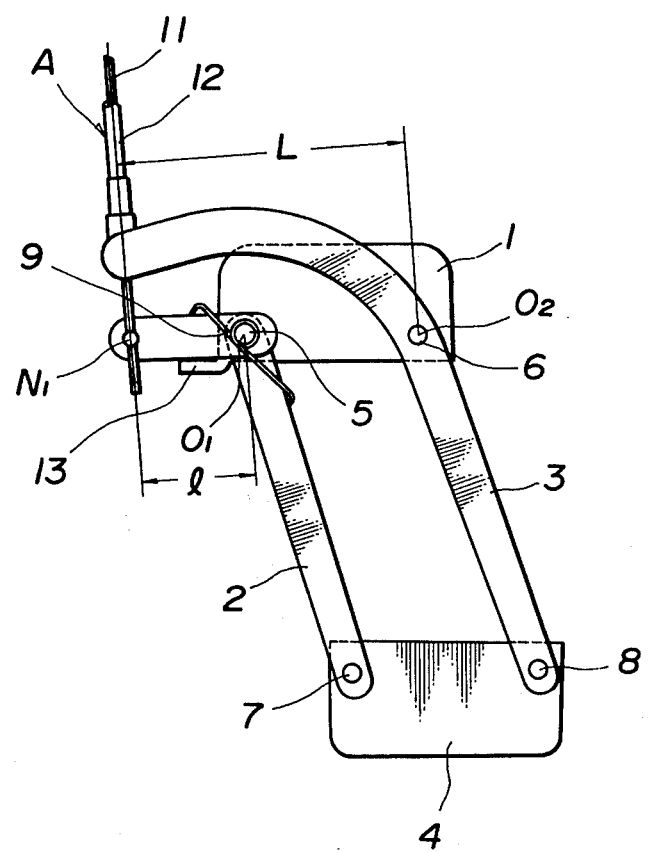
FIG. 2 is a view similar to FIG. 1 after the movable member has been shifted to the right.
Figure 3:
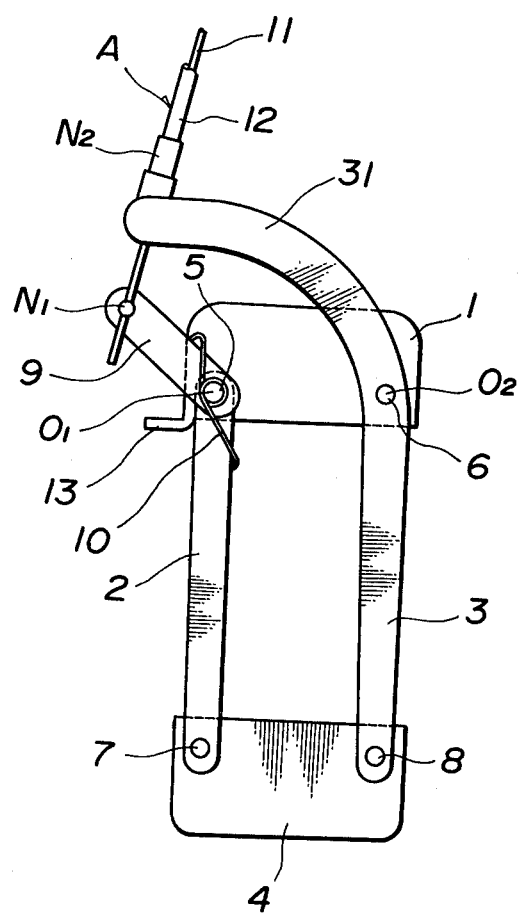
FIG. 3 is a view similar to FIG. 1 after the inner wire has been pulled but without movement of the movable member.

In FIGS. 1 through 3, certain parts have been eliminated for the sake of clarity, and it should be understood that in a complete working model, additional parts would be used.

Referring to FIGS. 1 through 3, reference numeral 1 designates the stationary member, number 2 designates a first linkage arm, number 3 designates a second linkage arm, and number 4 designates the movable member; these basic members of the pantograph would be used on either a rear or a front derailleur. Linkage arms 2 and 3 are pivoted to the stationary member 1 by means of pins 5 and 6 and at their other ends to the movable member 4 by means of pins 7 and 8.

The stationary member 1 which is attached to the bicycle frame is of two types; one is a swinging type having a bracket fixed to the bicycle frame and a support mounted to the bracket to be swingable over a given range, and the other type has no similar support.

Movable member 4 moves parallel to the stationary member 1 through linkage arms 2 and 3. When used as a rear derailleur, movable member 4 carries a changeover frame having two chain guide pulleys, and when used as a front derailleur, the movable member carries a chain guide.

Pivotal member 9, as shown in FIG. 1, is pivoted to the stationary member 1 through pin 5, the same pin to which linkage arm 2 is pivoted to the stationary member. Spring 10 is interposed between pivotal member 9 and first linkage arm 2. Inner wire 11 of a Bowden cable A is secured to the free end of the rocking member 9, and the outer sheath 12 thereof is secured to the distal end of an extension 31 of the second linkage arm 3. This extension is curved toward one side of the pivotal member. In FIG. 1, l represents the perpendicular distance from the center line N of the inner wire 11 to point $O_1$ which is the center of pin 5. L represents the perpendicular distance from the center line N of the inner wire to point $O_2$ which is the center of pin 6. The relationship is such that l is less than L. Abutment 13, which is a fixed extension of stationary member 1, acts to prevent any counterclockwise movement of pivotal member 9 in the direction of arrow X.

In the construction just described, the pivotal member 9 is an elongated plate which is pivoted to the pin 5 and spring 10 is preferably a coil spring having one end engaged with one edge of member 9 and the other end engaged with first linkage member 2.

Pivotal member 9 is always urged by the force of spring 10 toward abutment 13, that is, in the direction of arrow X, and the first linkage member 2 is urged in the direction of arrow Y by the spring 10. The forces involved are as follows:

$$F_1 = M/l$$

Where $F_1$ is the force necessary to pivot pivotal member 9 to overcome spring 10; M is the moment of force of spring 10 and l is the perpendicular distance from $O_1$ to the center N of wire 11.

$$F_2 = M/L$$

Where $F_2$ is the force necessary to shift the movable member 4 to overcome the force of spring 10; M is the moment of force of spring 10 and L is the perpendicular distance from $O_2$ to the center N of wire 11.

Since l is always less than L and these lengths are approximately constant when the linkage members move in the pantograph mechanism, $F_1$ is always greater than $F_2$ when the movable member 4 is free to move. Therefore pivotal member 9 will not normally pivot in relation to abutment 13.

Thus when inner wire 11 is pulled, movable member 4 will be moved to the right to assume the position as shown in FIG. 2 by action of the pantograph mechanism. That is, the pulling of wire 11 results in a relative movement between it and the outer sheath 12, in effect causing the outer sheath to push downwardly upon the extension of linkage arm 3.

On the other hand, if an attempt is made to shift the chain when the bicycle is stopped or the chain is not moving, the movable member 4 will encounter a very high resistance, far above a predetermined value, thus placing a much greater strain on the Bowden wire and sheath. This condition is depicted in FIG. 3 where the movable member 4 has not changed (compared to FIG. 1) but instead the movement of inner wire 11 has caused pivotal member 9 to pivot away from abutment 13, and to energize spring 10. This energy is stored in spring 10 until movable member 4 is free to respond, such as by the beginning of pedalling motion. When movable member 4 is free to respond the energy stored in spring 10 will cause the pantograph mechanism to assume the position shown in FIG. 2. That is, the distance between $N_1$ and $N_2$ will remain the same since the shifting between inner wire 11 and of outer sheath 12 has already been accomplished. But as pivotal member 9 is moved toward abutment 13 by the energy stored in spring 10 the effect will be to exert a downward force on arm 31 so as to cause movable member 4 to shift to the right and assume the position shown in FIG. 2.

As can be seen from the foregoing description, the greater the ratio is of l to L, the greater is the difference between the forces $F_1$ and $F_2$. Hence, the single spring 10 serves as both the return and energizing spring to perform speed changes without malfunction and to enable the movable member 4 to be shifted over a large range when necessary.

The embodiment of the invention applicable to a front derailleur and depicted in FIGS. 4 and 5 will now be described. In those Figures, the same reference numerals are used for parts which are identical with FIGS. 1-3. As is usual in the prior art, the stationary member 1 is secured to the bicycle frame 20 by means of a band 21. The first and second linkage members 2 and 3 are pivoted at one of their ends to stationary member 1 by pins 5 and 6 and the other ends are pivoted to movable member 4 by pins 7 and 8. A chain guide 22 is secured to movable member 4 for guiding the drive chain.

The pivotal member 9 has an angled portion at its distal end to which is secured a holder 23 for the outer sheath 12 of the Bowden wire. Pivotal member 9, as previously discussed, is pivoted to pin 5 along with the first linkage member as is shown in FIGS. 1-3. Spring 10 has one end engaged with the angled portion of pivotal member 9 and its other end engaged with pin 7. That end of the spring is preferably bent as shown in FIG. 5. Second linkage member 3 is extended at one of its ends to form an extension 31 to which inner wire 11 is secured by means of a fitting 24. The pivotal member 9 is secured through the outer sheath 12 by means of a holder 23, the positioning of the fitting and support being such that the lengths of the perpendiculars l and L are such that L is greater than l.

Figure 4:
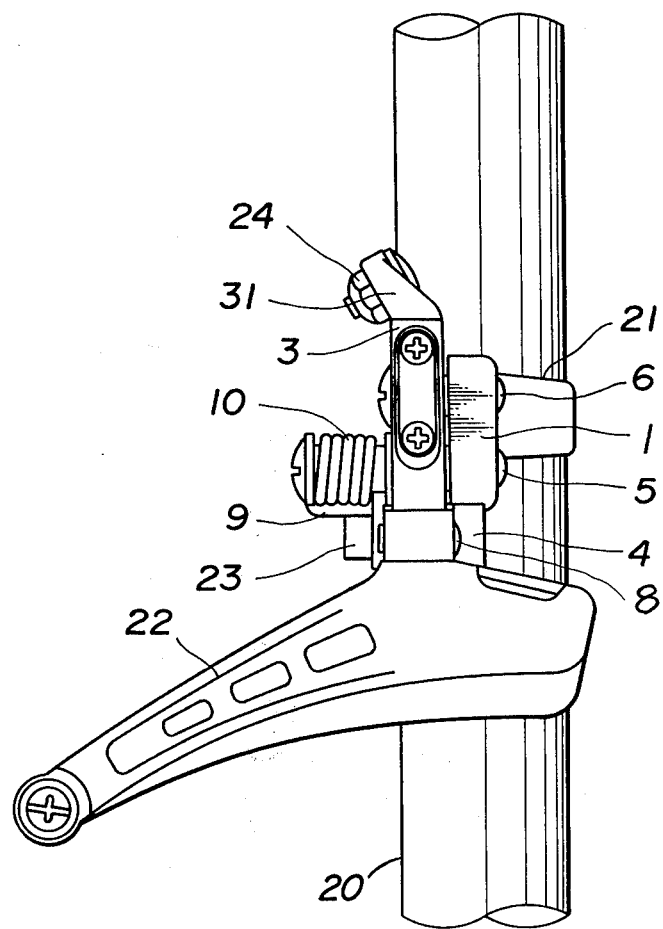
FIG. 4 is a front view of the complete mechanism.
Figure 5:
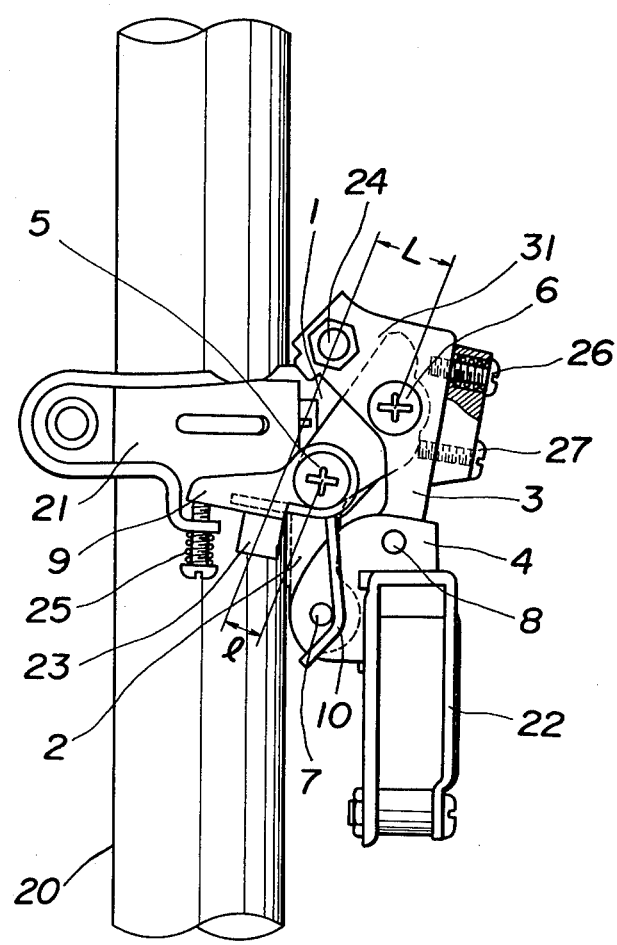
FIG. 5 is a side view of the complete mechanism.

In FIGS. 4 and 5, numeral 25 designates an adjusting screw which performs the function of abutment 13 and has its tip normally engaged with pivotal member 9. Screw 25 is adjustable to correct the position of the chain guide 22 so as to adjust the position of movable member 4 and consequently a chain guide 22 with respect to the sprockets. Such an adjustment may be necessary because of differing lengths of inner wire 11 in relation to the outer sheath 12.

In addition, adjusting screws 26 and 27 are provided on the second linkage member 30 so as to control linkage members 2 and 3 within the shifting range thereof.

The front derailleur constructed according to FIGS. 4 and 5 functions in the same manner as shown in FIGS. 1-3, that is, a single spring 10 serves as both a return spring and the loss motion connection means, so that normal speed changes can be conventionally made when the chain is moving, but when the chain is not moving or meets with abnormal resistance, then the pivotal member 9 will move away from its normal position and will store energy in spring 10 so that the movable member 4 (and chain guide 22) can later be moved when the abnormal resistance to chain 15 is no longer present.

Figure 6:
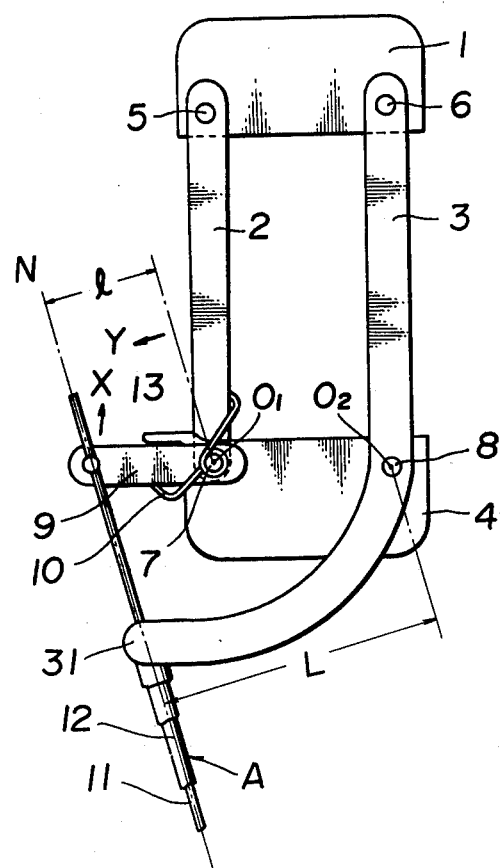
FIG. 6 is another embodiment of the invention.
Figure 7:
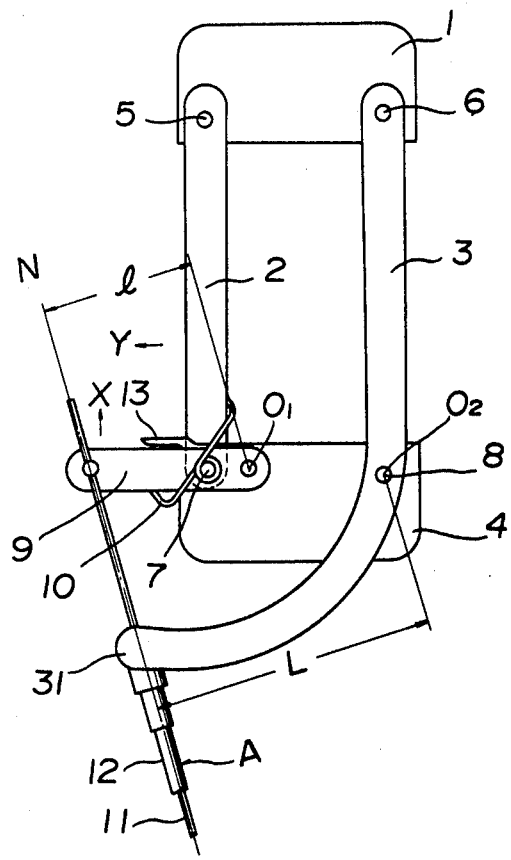
FIG. 7 illustrates yet another embodiment of the invention.

In the embodiment of FIGS. 4 and 5, spring 10 has one of its ends engaged with pin 7, but this spring end can also be engaged with linkage member 2 as shown in FIGS. 1-3. There are various alternative locations for spring 10, it is only necessary that it be engaged with one end in contact with pivotal member 9 and the other end in contact with the first linkage member 2 or the movable member 4 or some other member which moves relative to stationary member 1. Although the aforesaid constructions all have the pivotal member 9 mounted to the stationary member 1, it should also be noted as in FIG. 6 and FIG. 7 that the pivotal member may be mounted to the movable member 4 or to the first linkage member 2. Of course, the use of the terms first and second in relation to the linkage members is for convenience of illustration only and the terms could be interchanged.

The foregoing disclosure is for the purpose of disclosing a specific perferred embodiment and the scope of this invention is of course not limited to this specific construction, but as defined in the following claims.

What is claimed is:

1. A derailleur for a bicycle, controllable by a Bowden cable having an inner wire and an outer sheath to change the bicycle speed by shifting a driving chain when said driving chain is moving, said derailleur comprising:
    (a) a pantograph mechanism,
    said pantograph mechanism comprising; a stationary member; first and second linkage members each pivoted by one of their ends to said stationary member; and a movable member pivotally mounted to the other ends of each of said linkage members; said second linkage member extending at one of its ends outwardly to form an extension, said extension having at its distal end a first retaining means for retaining one of said inner wire or outer sheath, said movable member carrying a chain guide for guiding said driving chain;
    (b) a pivotal member pivoted to one of said stationary member, movable member or first linkage member of said pantograph mechanism;
    said pivotal member having at its distal end a second retaining means for retaining the other of said inner wire or outer sheath, the perpendicular distance from the center line of second retaining means to the pivot point of said pivotal member being smaller than that from the center line of said first retaining means to the pivot point around which said extension of the second linkage member pivots,
    (c) an abutment for limiting the movement of said pivotal member in a direction away from said extension of said linkage member, and
    (d) a spring between said pivotal member and another member movable relative thereto, said spring biasing said pivotal member in the direction away from said extension of the second linkage member against said abutment and biasing said movable member toward one change state; whereby when a shifting force is applied between the inner wire and outer sheath during motion of said driving chain, said extension of said linkage member moves toward said pivotal member whereby said movable member changes positions and said spring provides a return force for returning said movable member after said driving chain has been shifted, and provides storage of a force for shifting said movable member when said driving chain is at rest.

2. The derailleur of claim 1, wherein said pivotal member is pivoted to said stationary member and the extension of said second linkage member extends along one side of the stationary member and toward the pivotal member.

3. The derailleur of claim 2, wherein said pivotal member is pivoted to a pivot pin which extends from said stationary member and pivotally supports said first linkage member.

4. The derailleur of claim 1, wherein said pivotal member is pivoted to said movable member.

5. The derailleur of claim 1, wherein said pivotal member is pivoted to a pin which extends from said movable member and pivotally supports said first linkage member.

6. The derailleur of claim 1, wherein said pivotal member is pivoted to said first linkage member.

* * * * *